United States Patent [19]

Carrington

[11] Patent Number: 5,459,598
[45] Date of Patent: Oct. 17, 1995

[54] OPTICAL MODULATION DEVICE WITH LIQUID CRYSTAL VOIDS FORMED BY THE SPACER ARRANGEMENTS

[75] Inventor: Andrew N. Carrington, Berkhamsted, England

[73] Assignee: Thorn EMI plc, Middlesex, England

[21] Appl. No.: 256,545

[22] PCT Filed: Jan. 15, 1993

[86] PCT No.: PCT/GB93/00091

§ 371 Date: Jul. 13, 1994

§ 102(e) Date: Jul. 13, 1994

[87] PCT Pub. No.: WO93/14437

PCT Pub. Date: Jul. 22, 1993

[30] Foreign Application Priority Data

Jan. 15, 1992 [GB] United Kingdom .................. 9200839

[51] Int. Cl.[6] .................................................. G02F 1/1339
[52] U.S. Cl. .................................... 359/81; 359/80; 359/100
[58] Field of Search .................................. 359/80, 81, 100

[56] References Cited

U.S. PATENT DOCUMENTS 4,832,460   5/1989   Fujimura et al. .................... 359/80

FOREIGN PATENT DOCUMENTS 2157451A   10/1985   United Kingdom .................. 359/81

Primary Examiner—Anita Pellman Gross
Assistant Examiner—Walter J. Malinowski
Attorney, Agent, or Firm—Keck, Mahin & Cate

[57] ABSTRACT

An optical modulation device includes first (1,4,6) and second (2,5,7) optically transmissive parallel plates having a ferroelectric liquid crystal material sandwiched between them. A plurality of spacer members (10), each secured to one of the plates, are located between the plates to maintain the plate spacing. The spacer members form walls defining parallel liquid crystal material-containing channels (11) which extend parallel to the plates. These channels communicate along their lengths with cavities (12) at least partly defined by the spacer members (10). These cavities may be created by segmenting each wall, the separations between the successive segments constituting the respective cavities. Alternatively, each wall may be provided with a parallel auxiliary wall of lesser height close to it but spaced from it, the space between the two walls forming a cavity.

5 Claims, 5 Drawing Sheets

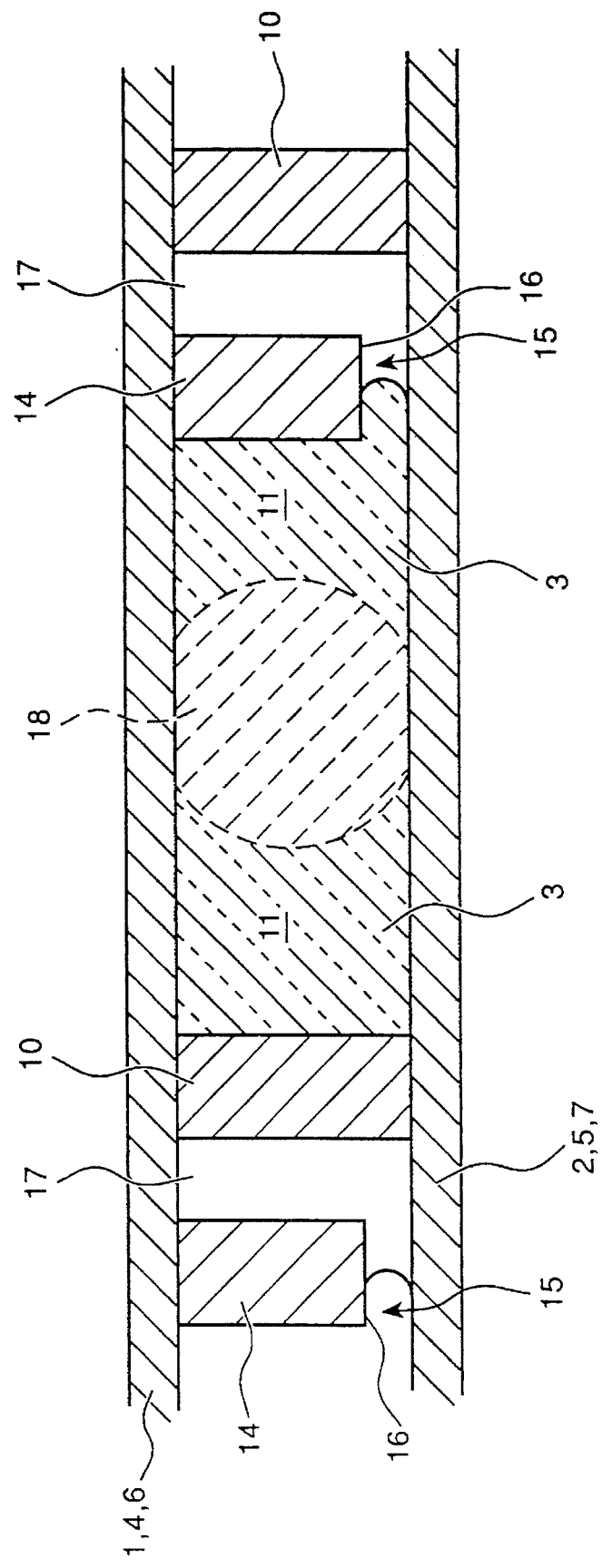

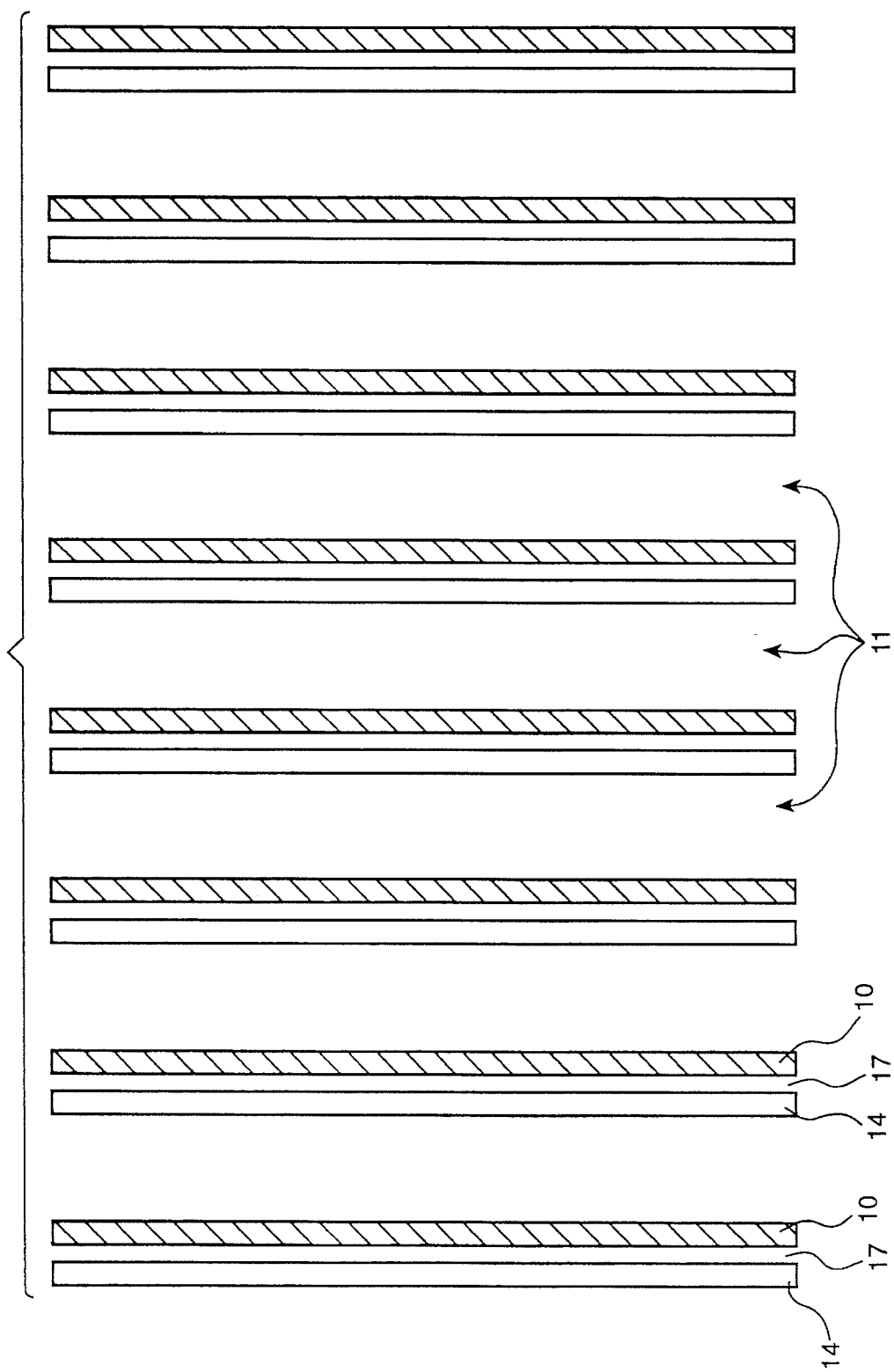

OPTICAL MODULATION DEVICE WITH LIQUID CRYSTAL VOIDS FORMED BY THE SPACER ARRANGEMENTS

This invention relates to an optical modulation device including first and second optically transmissive parallel plates having a ferroelectric liquid crystal material sandwiched therebetween, a plurality of spacer members, each secured to a said plate, being located between said plates for maintaining spacing between said plates at a predetermined value, said spacer members defining substantially parallel liquid crystal material-containing channels extending parallel to the plates.

A device of the above general kind is known, for example, from GB-B-2157451. In such devices the facing surfaces of the two plates are normally provided with respective arrays of optically transmissive electrodes, for example, mutually orthogonal grids of electrodes, by means of which portions of the liquid crystal material can be selectively addressed. Such addressing enables optical properties of selected portions of the material to be changed. If the assembly of the two plates is positioned between crossed polarisers, the said addressing can result in modification of the optical transmissivity of selected areas of the resulting device, thereby enabling it to be used, for example, as a television display device.

In the device known from GB-B-2157451 the spacer members take the form of parallel solid walls all of which are secured to one plate and extend from one side of the plate to the other. According to the disclosure of GB-B-2157451 the walls of the device disclosed therein serve the additional purpose of improving monodomain formability in the liquid crystal material, and to this end they are oriented parallel with or perpendicular to a monaxial orientation treatment (conventionally a rubbing treatment) which has been applied to the face of at least one of the two plates contacting the liquid crystal material.

Devices of the general kind specified in the first paragraph can be subjected to substantial temperature variations. This can give rise to problems in some cases if spacer members of the kind disclosed in GB-B-2157451 are employed. In particular differences in the thermal expansion coefficients of the materials of the spacer members and the plate to which they are secured may give rise to disruption of the structural integrity of the device.

Devices of the general kind specified in the first paragraph can, moreover, be subjected to mechanical deformation forces which cause parts of the liquid crystal material to move relative to other parts thereof. If the spacing between the plates is small and the liquid crystal material has a high viscosity this can result in changes in physical properties of parts of the material which have a deleterious effect on operation of the device and which can only be reversed with difficulty.

It is an object of the present invention to enable one or both of the above problems to be mitigated.

The invention provides an optical modulation device including first and second optically transmissive parallel plates having a ferroelectric liquid crystal material sandwiched therebetween, a plurality of spacer members, each secured to a said plate, being located between said plates for maintaining spacing between said plates at a predetermined value, said spacer members defining substantially parallel liquid crystal material-containing channels extending parallel to the plates, which channels communicate along their lengths with cavities at least partly defined by the spacer members.

Sets of the spacer members may be each configured as successive spaced segments of a respective wall which runs between a said channel and an adjacent said channel, spaces between the segments constituting the said cavities. If this is the case segmented versions of the solid walls of GB-B-2157451 can in effect be obtained. It has been found that such segmented versions can have an adequate spacing and strengthening effect without causing the device to suffer unduly from the effects of temperature changes. Moreover, if the members of a first subset of a said set are secured to the first plate and the members of a second subset of the said set are secured to the second plate these members can be arranged so that the members of the two subsets form an interdigitated structure. This can give rise to a further strengthening effect if the spaces between the successive wall segments are small, as the segments can then resist relative movement between the two plates in a direction parallel to the length direction of the walls. Possible configurations which enable this strengthening effect to be obtained are, for example, a configuration in which the spacer members constituting the successive segments of each wall are secured alternately to the first plate and to the second plate, and a configuration in which pairs of adjacent spacer members constituting the successive segments of each wall are secured alternately to the first plate and to the second plate.

If the aforesaid cavities are sufficiently small that surface forces and/or residual trapped gas prevent complete penetration thereof by the liquid crystal material, then the resulting voids will be, in general, more compressible than the liquid crystal material. Presence of such voids can result in a reduction in bulk flow of the liquid crystal material should the device be subjected to mechanical deformation forces, and hence in a reduction in the deleterious effect of such forces on the operation of the device referred to hereinbefore. Such a beneficial effect can be obtained, for example, if the cavities are constituted by spaces between successive wall segments as set forth above, or otherwise. A preferred construction in this respect is one in which the spacer members are in the form of walls each of which reins between a said channel and an adjacent said channel, each said wall having an auxiliary wall associated therewith, which auxiliary wall is secured to a said plate, is spaced from the wall with which it is associated and runs between the said channel and adjacent channel, the space between the two walls forming a said cavity and being at least partly devoid of said ferroelectric liquid crystal material. In such a case each auxiliary wall is preferably of lesser height than the wall with which it is associated, so that a gap exists between its top and the said plate other than that to which it is secured.

Making each auxiliary wall of lesser height than the wall with which it is associated can facilitate communication between the space containing the liquid crystal material and the space between the two walls, although in some circumstances useful communication might conceivably be obtained if the two walls are of the same height.

Each auxiliary wall and the wall with which it is associated may be secured to the same said plate, although preferably each said auxiliary wall is secured to one said plate and the wall with which it is associated is secured to the other said plate.

Preferably a plurality of further spacer members are located in said channels, said further spacer members adhering to both of said plates. Provision of such further spacer members can increase the mechanical strength of the device.

Embodiments of the invention will now be described, by way of example, with reference to the accompanying diagrammatic drawings, in which FIG. 1 is a diagrammatic edge-on view of a first embodiment, FIG. 2 is a diagrammatic plan view of part of the embodiment of FIG. 1, FIGS. 3a, 3b, 3c and 3d are diagrams illustrating some possible ways in which parts of the embodiment of FIGS. 1 and 2 may be secured.

FIG. 4 is a diagrammatic edge-on view of a second embodiment, and

FIG. 5 is a diagrammatic plan view of part of the embodiment of FIG. 4.

Figure 1:
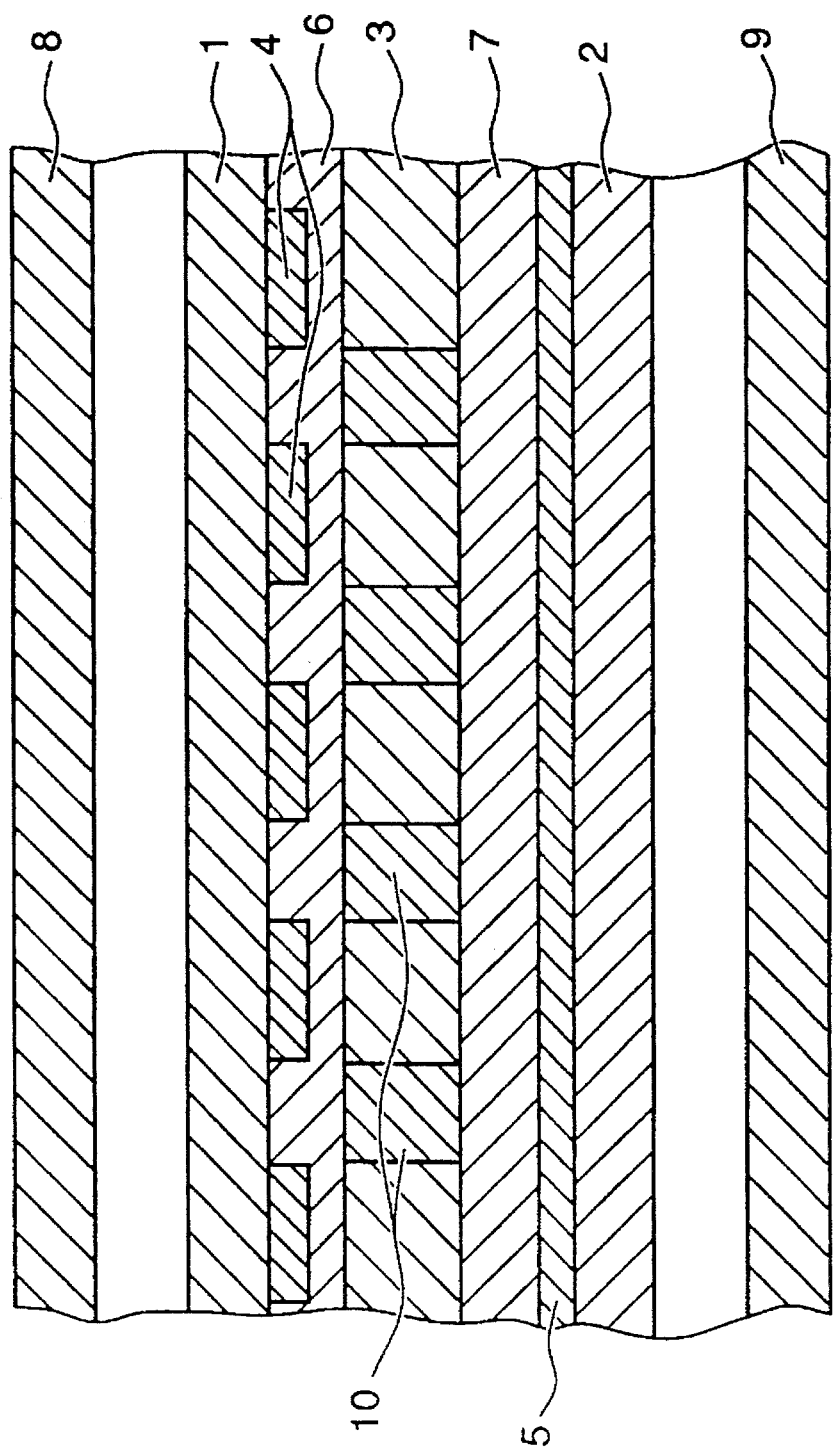

In FIG. 1 an optical modulation device, part of which is shown diagrammatically edge-on, comprises first and second optically transparent parallel plates 1 and 2, for example of glass, having a ferroelectric liquid crystal material 3 sandwiched between them. Selected portions of the liquid crystal material can be addressed in known manner by means of a grid of parallel transparent electrodes 4, for example of indium tin oxide, positioned on the inner surface of the plate 1, and a similar but orthogonal grid of parallel transparent electrodes 5 positioned on the inner surface of the plate 2. The electrodes 4 and 5 are separated from the material 3 in known manner by barrier-and-alignment layers 6 and 7 respectively. (An assembly including the above-mentioned components is known, for example, from a paper "An 8.5" Digital Ferroelectric Video Rate Colour Display" by P W H Surguy et al presented to the 1990 Eurodisplay conference and published in "Eurodisplay '90" at page 146 et seq.) The assembly is positioned between crossed polariser plates 8 and 9 respectively. Optical transmission of selected areas of the resulting optical modulation device can be varied in known manner by addressing the corresponding portions of the liquid crystal material 3 by means of the relevant ones of the electrodes 6 and 7.

A plurality of spacer members 10, each secured to one or the other of the transparent plate assemblies 1,4,6 or 2,5,7, are located between these assemblies for maintaining spacing between these assemblies at a predetermined value. These spacer members form segments of parallel walls which extend perpendicular to the plane of the paper and thereby define parallel channels, also extending perpendicular to the plane of the paper (and parallel to the plate assemblies 1,4,6 and 2,5,7), containing the liquid crystal material 3.

Figure 2:
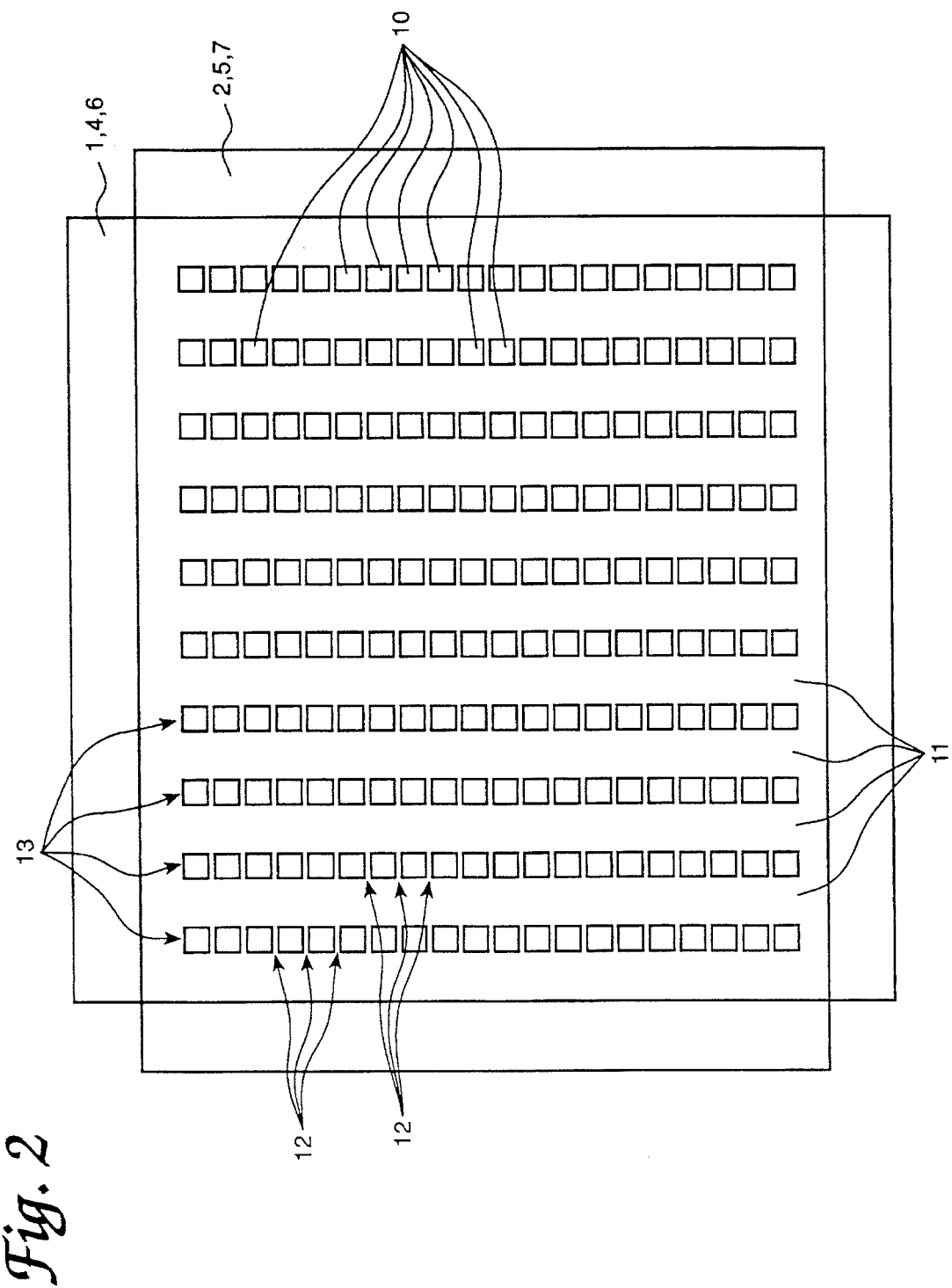

These spacer members 10 are shown diagrammatically in the plan view of FIG. 2, together with the channels 11 therebetween. As will be seen from FIG. 2 the spacer members 10 are substantially square. Spaces 12 between the successive spacer members 10 making up each wall 13 form cavities communicating with the channels 11. Preferably the spaces 12 are sufficiently small that surface forces prevent complete penetration thereof by the liquid crystal material 3.

Figure 3C:
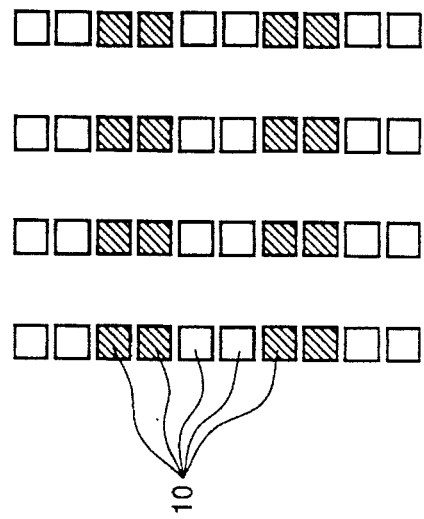
Figure 3D:
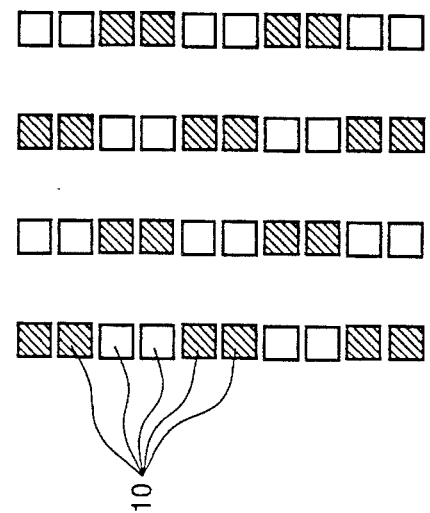
Figure 3A:
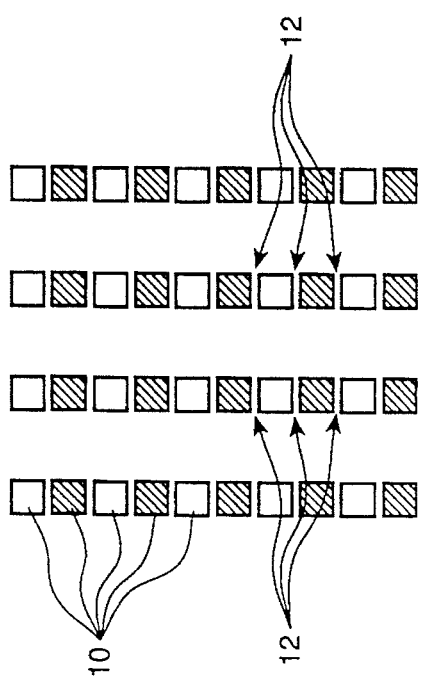
Figure 3B:
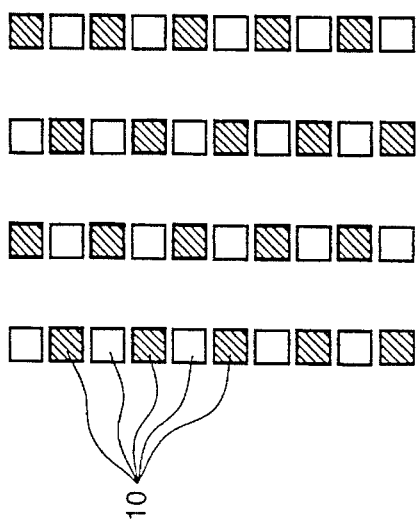

Preferably substantially equal numbers of the set of spacer members 10 which make up at least one and preferably each of the walls 13 are secured to the plate assembly 1,4,6 and to the plate assembly 2,5,7 respectively. This may be done, for example, by arranging that the spacer members 10 constituting the successive segments of each wall 13 are secured alternately to the plate assembly 1,4,6 and to the plate assembly 2,5,7, either as shown diagrammatically in FIG. 3 or as shown diagrammatically in FIG. 3b, in which Figures the shaded squares denote spacer members secured to one assembly and the open squares denote spacer members secured to the other assembly. As an alternative, pairs of adjacent spacer members constituting the successive segments of each wall may be secured alternately to the plate assembly 1,4,6 and to the plate assembly 2,5,7, either as shown diagrammatically in FIG. 3c or as shown diagrammatically in FIG. 3d.

As will be evident from FIG. 1, the segmented walls 13 formed by the spacers 10 are in all cases aligned with the gaps between successive electrodes 4. Although, as shown, respective walls are provided aligned with each successive such gap, this is not essential; respective walls may, for example, be provided aligned with only alternate ones of the successive such gaps.

FIG. 4 is a diagrammatic view, analogous to that of FIG. 1, of part of an alternative construction to those described so far with reference to FIGS. 1 to 3.

In FIG. 4, each spacer member 10, which is now in the form of a continuous wall extending perpendicular to the plane of the paper, has associated with it an auxiliary wall 14 which is also secured to one of the plate assemblies 1,4,6 and 2,5,7, preferably the other one of these assemblies to that to which the member 10 is secured, to facilitate manufacture. Each auxiliary wall 14 is spaced from, and is of lesser height than, the wall 10 with which it is associated so that a gap 15 exists between its top 16 and the other plate assembly (2,5,7) to that to which it is secured. This gap 15 forms a communication between the cavity 17 between the two walls and the adjacent liquid crystal material-containing channel 11. The gaps 16 are sufficiently small that surface forces and/or residual trapped gas prevent complete penetration of the liquid crystal material 3 into the cavities 16,17.

FIG. 5 is a diagrammatic plan view, analogous to those of FIGS. 3a–3d, showing the members 10 of FIG. 4, together with their associated auxiliary walls 14, the shading of the walls 10 denoting that they are secured to one plate assembly 1,4,6 or 2,5,7, whereas the walls 14 are secured to the other.

A further spacer member 18 is shown in dashed lines in FIG. 4, located in a channel 11. A plurality of such, substantially spherical, further spacer members may be provided in the various channels 11, if desired, this also being applicable to the embodiments described with reference to FIGS. 1 to 3. The spacer member 18 is a so-called "sticky spacer" such as is available, for example, under the trade name "TORRAY". These sticky spacers are initially in the form of partly cured epoxy spheres which are squashable. After locating and squashing them between the plate assemblies 1,4,6 and 2,5,7, a raised temperature accompanied by pressure on the plate assemblies 1,4,6 and 2,5,7 completes the curing, resulting in the further spacer members 18 adhering to botch plate assemblies, thereby enhancing the mechanical strength of the construction.

The spacer members 10, and the auxiliary walls 14 if present, may conveniently be formed of polyimide which is spun on the appropriate surface of the relevant plate assembly 1,4,6 or 2,5,7 to provide a layer of appropriate thickness. Appropriate parts of this layer are then removed using a photoresist-employing process to leave the correctly-positioned spacer members 10, and/or auxiliary walls 14 if present. The two plate assemblies together with the secured spacer members 10, and auxiliary walls 14 if present, are then brought together, an edge seal is cured, and the resulting structure is vacuum back-filled with the liquid crystal material 3.

It should be noted that the length direction of the walls 13 may take any desired angle with the rubbing direction(s) of the alignment layers 6 and 7 of FIG. 1.

In one device constructed in the manner described with reference to FIGS. 1–3 the spacing between the two plates 1,4,6 and 2,5,7 was 1.5 μm, the widths of the channels 11 were 90 μm, the widths of the walls 13 were 20 μm as were the lengths of the successive segments thereof, and the separations between the successive spacer members 10 constituting these segments were 5 μm. These separations were in fact too large to obtain predictable trapping of gas therein when the device was filled with the liquid crystal material 3; a substantial reduction, for example to about 0.3 μm, was found to be required to achieve this. However the presence of the separations did make the material of the walls 13 markedly less likely to become detached from the plates to which they were secured.

In one device constructed in the manner described with reference to FIGS. 4 and 5 the spacing between the two plates 1,4,6 and 2,5,7 was again 1.5 μm, the widths of the channels 11 were 80 μm, the widths of the walls 10 and 14 were 10 μm as was the spacing between each wall 10 and its adjacent auxiliary wall 14, and the gap 15 between the top 16 of each auxiliary wall and the other plate assembly to that to which that auxiliary wall was secured was 0.3 μm. This gap was sufficiently small to prevent significant penetration of liquid crystal material 3 into the corresponding cavity 17, as required.

With both devices the particular liquid crystal material used, for example one of those obtainable from Messrs. Merck, had a viscosity of less than $10^{-2} Nm^{-2}s$ at the filling temperature.

I claim:

1. An optical modulation device including first (1) and second (2) optically transmissive parallel plates which face and are spaced from each other, ferroelectric liquid crystal material (3) sandwiched between said plates, and a plurality of spacer members (10), each secured to a said plate, located between said plates for maintaining the spacing between the plates at a predetermined value, said spacer members forming elongate barriers (13) to flow of liquid crystal material, which barriers extend parallel to each other and to the plates, characterized in that the barriers are segmented, spaces (12) between the successive segments of each barrier being sufficiently small that liquid crystal material voids are present within them.

2. A device as claimed in claim 1, wherein the members of a first subset of the respective set of spacer members (10) forming the segments of each barrier are secured to the first plate (1) and the members of a second subset of said set are secured to the second plate (2) so that the two subsets form an interdigitated structure.

3. An optical modulation device including first (1) and second (2) optically transmissive parallel plates which face and are spaced from each other, ferroelectric liquid crystal material (3) sandwiched between said plates, and a plurality of spacer members (10), each secured to a said plate, located between said plates for maintaining the spacing between the plates at a predetermined value, said spacer members forming elongate strips (10) which extend parallel to each other and to the plates and constitute barriers to flow of liquid crystal material, characterized in that each strip has an auxiliary strip (14) associated with it, which auxiliary strip is secured to a said plate, runs parallel to but spaced from the strip (10) with which it is associated and on the same side of the strip with which it is associated, and is of insufficient height to contact the plate other than that to which it is secured, the resulting gap (15) between each auxiliary strip (14) and the plate other than that to which it is secured being sufficiently small that liquid crystal material voids are present between each auxiliary strip and the strip with which it is associated.

4. A device as claimed in claim 3, wherein each auxiliary strip (14) is secured to one said plate and the strip (10) with which it is associated is secured to the other said plate.

5. A device as claimed in claim 3, including a plurality of further spacer members (18) adhering to both of said plates (1,2).

* * * * *